US012620866B2

(12) United States Patent
Kharal et al.

(10) Patent No.: US 12,620,866 B2
(45) Date of Patent: May 5, 2026

(54) WIRING HARNESS CONDUCTIVE SHIELD TERMINATION ARRANGEMENT

(71) Applicant: PRATT & WHITNEY CANADA CORP., Longueuil (CA)

(72) Inventors: Fraz Ahmad Kharal, Brampton (CA); Antwan Shenouda, Mississauga (CA)

(73) Assignee: PRATT & WHITNEY CANADA CORP, Longueuil (CA)

( * ) Notice: Subject to any disclaimer, the term of this patent is extended or adjusted under 35 U.S.C. 154(b) by 294 days.

(21) Appl. No.: 18/435,501

(22) Filed: Feb. 7, 2024

(65) Prior Publication Data

US 2025/0253736 A1     Aug. 7, 2025

(51) Int. Cl.
| | |
|---|---|
| *H02P 7/06* | (2006.01) |
| *B64D 27/33* | (2024.01) |
| *B64D 31/18* | (2024.01) |
| *H01B 7/18* | (2006.01) |
| *H02K 5/22* | (2006.01) |
| *H02K 5/24* | (2006.01) |

(52) U.S. Cl.
CPC .............. *H02K 5/24* (2013.01); *B64D 27/33* (2024.01); *B64D 31/18* (2024.01); *H01B 7/1805* (2013.01); *H02K 5/225* (2013.01)

(58) Field of Classification Search
CPC .......... H02K 5/24; H02K 5/225; H02K 11/02; H02K 11/0141; H02K 11/33
See application file for complete search history.

(56) References Cited

U.S. PATENT DOCUMENTS

| | | | |
|---|---|---|---|
| 6,310,286 | B1 | 10/2001 | Troxel et al. |
| 8,963,015 | B2 | 2/2015 | Wittkop |
| 10,389,213 | B2 | 8/2019 | Xiao et al. |
| (Continued) | | | |

FOREIGN PATENT DOCUMENTS

| | | |
|---|---|---|
| DE | 102008013416 A1 | 10/2009 |
| GB | 2546168 A | 7/2017 |
| JP | 2016119747 A | 6/2016 |
| (Continued) | | |

OTHER PUBLICATIONS

Sew Eurodrive: "Drive Technology \ Drive Automation \ System Integration \Services Drive Engineering—Practical Implementation EMC in Drive Engineering—Theoretical Principles—EMC-Compliant Installation in Practice", Apr. 30, 2014 (Apr. 30, 2014), XP055690611, Retrieved from the Internet: URL:https://download. sew-eurodrive.com/download/pdf/11535814.pdf [retrieved on Apr. 30, 2020].

(Continued)

*Primary Examiner* — Muhammad S Islam
(74) *Attorney, Agent, or Firm* — NORTON ROSE FULBRIGHT CANADA LLP

(57) ABSTRACT

A system for transmitting an alternating current in an aircraft. The system includes a source of electricity in the aircraft having a source connector housing, an electric load in the aircraft having a load connector housing, a cable electrically coupling the source of electricity to the electric load, a shield surrounding the cable and having a first end electrically connected to the source connector housing, and a capacitor disposed inside the load connector housing and electrically coupling a second end of the shield to the load connector housing.

20 Claims, 6 Drawing Sheets

(56)      References Cited

U.S. PATENT DOCUMENTS

2006/0071622 A1 *   4/2006   Townsend ............... H02K 11/05
                                                318/400.31
2016/0203887 A1     7/2016   Wiemeyer

FOREIGN PATENT DOCUMENTS

| | | |
|---|---|---|
| JP | 2017069601 A | 4/2017 |
| WO | 2012085242 A2 | 6/2012 |
| WO | 2014115773 A1 | 7/2014 |

OTHER PUBLICATIONS

European Search Report issued in counterpart application No. 25156625.3 on Jul. 9, 2025.

* cited by examiner

_FIF_-4

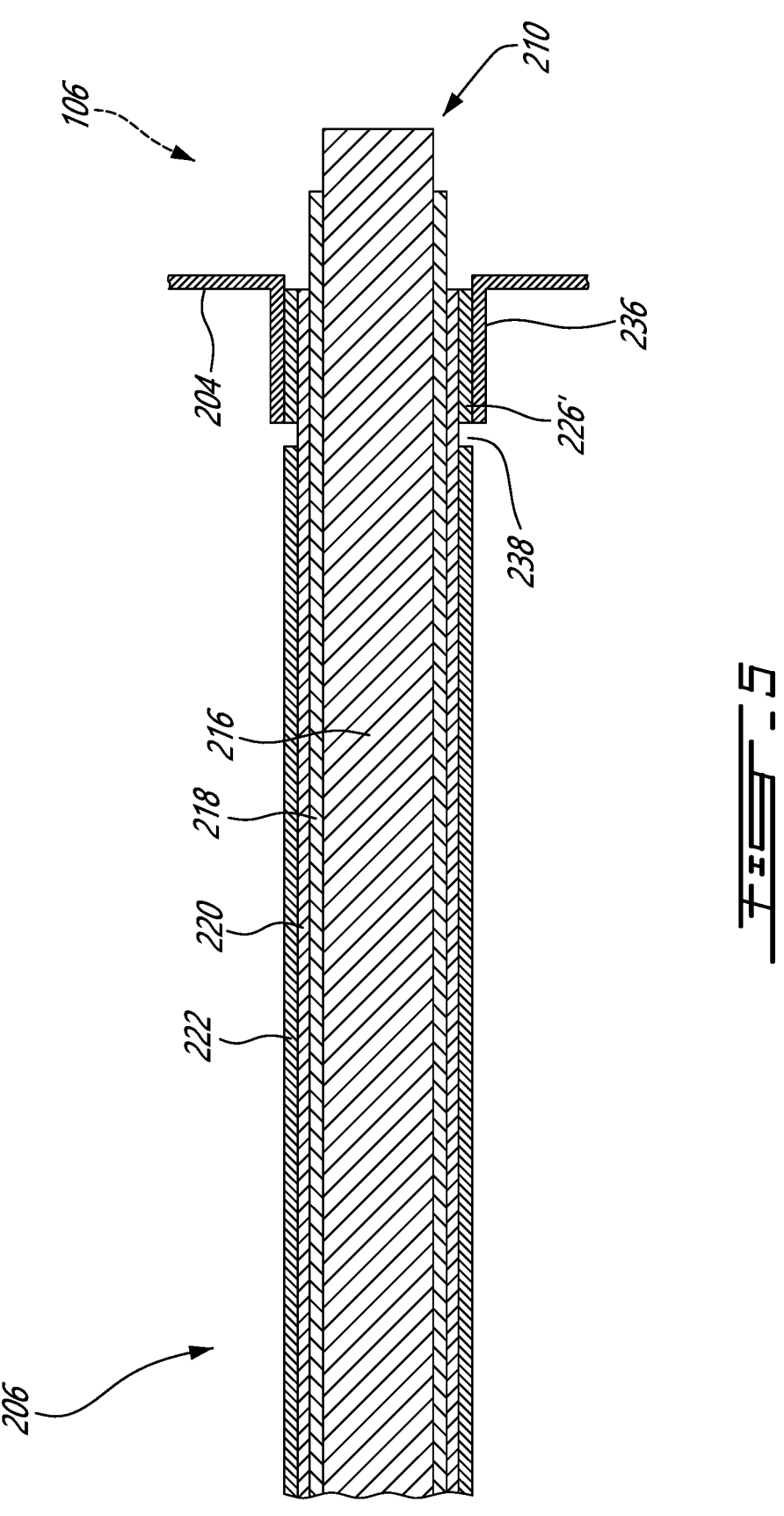
_FIG. 5_

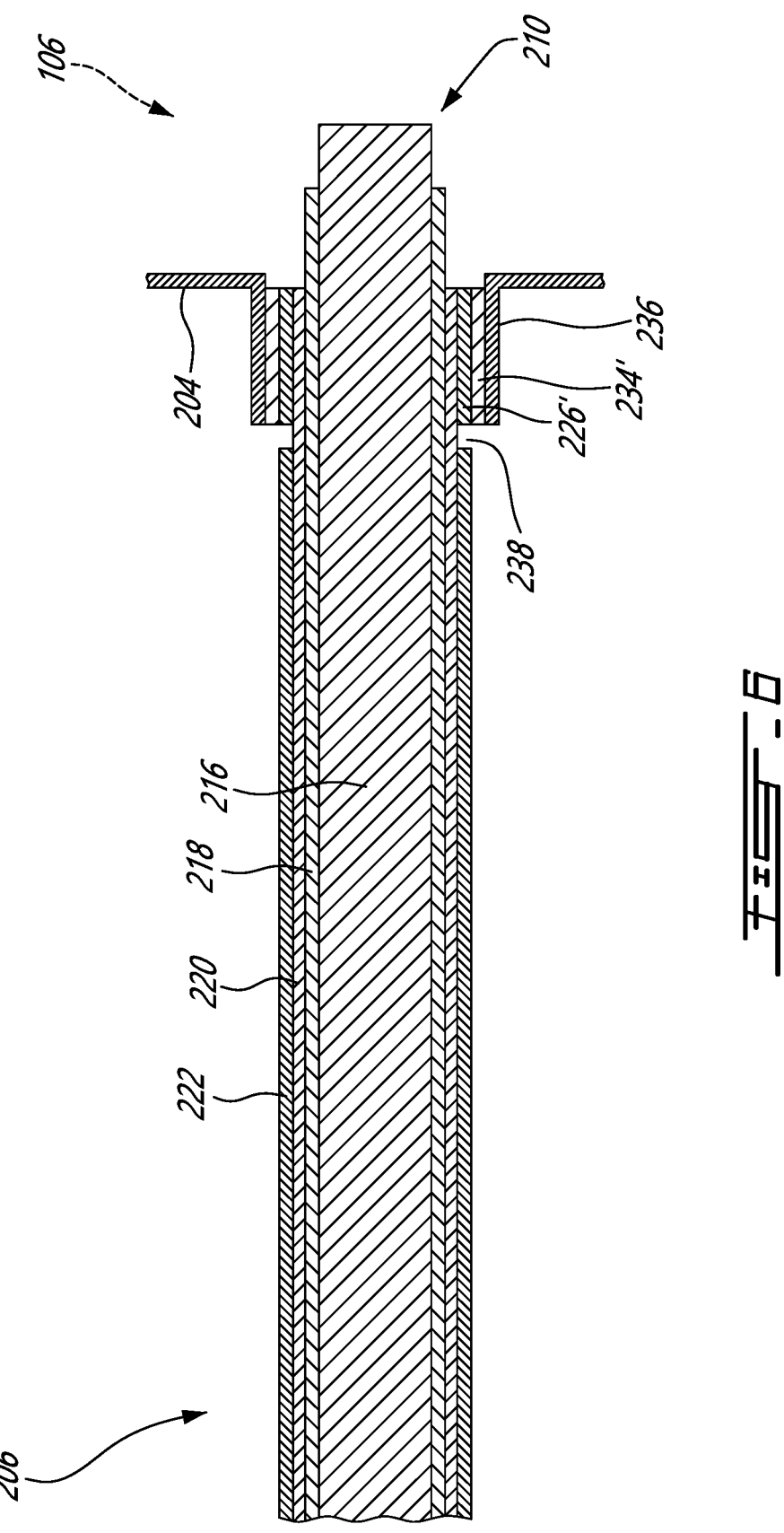
_Fig. 6_

WIRING HARNESS CONDUCTIVE SHIELD TERMINATION ARRANGEMENT

TECHNICAL FIELD

The disclosure relates generally to electrical connectors, and, more particularly, to electrical connectors which offer protection against electromagnetic interference and environmental contamination.

BACKGROUND

In electrical systems, for instance in the context of a hybrid-electric propulsion system, it may be desirable to mitigate electromagnetic interference (EMI). Typically, shielding is employed in cables and wires to contain and redirect electromagnetic fields. The cable shield may be grounded at each cable end to help dissipate electromagnetic energy that might otherwise interfere with the signals carried by the cable. However, when the shield is grounded at both ends, it may form a conductive path, allowing currents induced by electromagnetic fields to flow, which may lead to localized heating. Improvements are thus always desirable.

SUMMARY

In one aspect, there is provided a system for transmitting an alternating current in an aircraft, comprising: a source of electricity in the aircraft having a source connector housing; an electric load in the aircraft having a load connector housing; a cable electrically coupling the source of electricity to the electric load; a shield surrounding the cable and having a first end electrically connected to the source connector housing; and a capacitor disposed inside the load connector housing and electrically coupling a second end of the shield to the load connector housing.

In another aspect, there is provided electric motor system for an aircraft, comprising: a motor controller having a motor controller connector housing; an electric motor having an electric motor connector housing; a cable electrically coupling the motor controller to the electric motor; and a shield extending from a first end to a second end, the shield surrounding the cable and grounded to the motor connector housing at the first end and to the electric motor connector housing at the second end, the shield electrically coupled to one of the motor controller connector housing and the electric motor connector housing via a capacitor disposed inside the one of the motor controller connector housing and the electric motor connector housing.

In a further aspect, there is provided an hybrid-electric propulsion system for an aircraft, comprising: an air mover; a heat engine rotatably coupled to the air mover; an electric motor rotatably coupled to the air mover; a motor controller; and a three-phase cable assembly electrically coupling the motor controller to the electric motor, the three-phase cable assembly comprising three cables arranged in parallel, each of the three cables having a shield surrounding each of the three cable and grounded to a connector for the electric motor via a capacitor disposed in the connector for the electric motor.

BRIEF DESCRIPTION OF THE DRAWINGS

Reference is now made to the accompanying figures in which:

FIG. 5 is a schematic depiction of another cable shield system between the electric motor controller and electric motor of FIG. 2; and FIG. 6 is a schematic depiction of another cable shield system between the electric motor controller and electric motor of FIG. 2.

DETAILED DESCRIPTION

Figure 1:
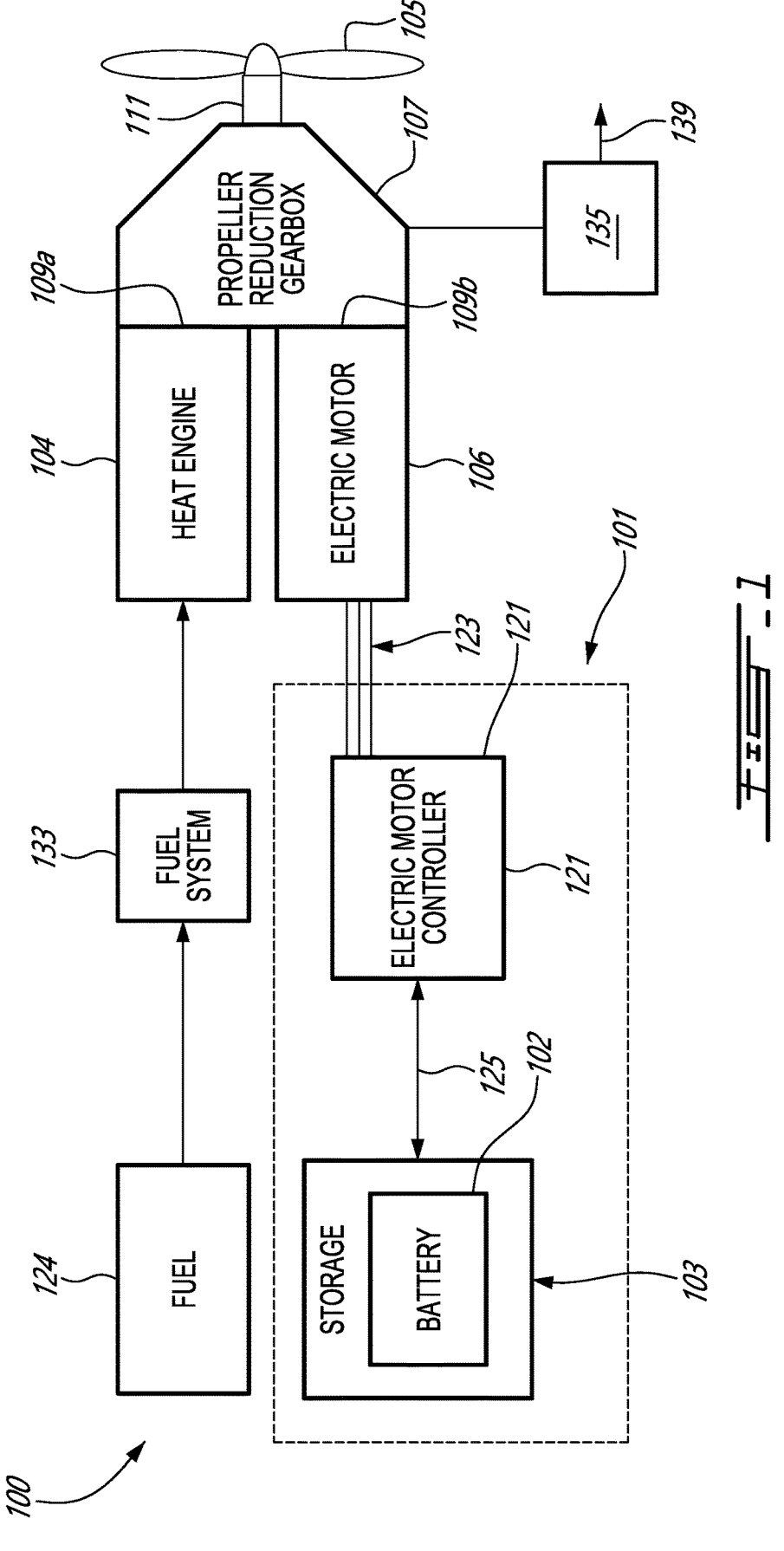
FIG. 1 is a schematic depiction of an embodiment of a hybrid-electric propulsion system.

Referring to FIG. 1, there is shown an exemplary hybrid-electric propulsion system 100 for an aircraft. An electrical system 101 is part of the hybrid-electric propulsion system 100. The hybrid-electric propulsion system 100 includes a heat engine 104, e.g. a thermal engine, and an electric motor/machine 106, which on their own or together drive an air mover 105, e.g. a propeller, fan or the like, by way of a reduction gear box 107 and output shaft 111. The reduction gear box 107 has an input 109a for heat engine 104 and an input 109b for electric motor 106. Those skilled in the art will also readily appreciate that a clutch can be disposed between the reduction gear box 107 and the respective heat engine 104 and another clutch can be disposed between the electric motor 106 and the reduction gear box 107. It is understood that the electric motor 106 may have a motor mode and a generator mode. The term "electric motor" is thus herein intended to encompass such "electric machine".

It is contemplated that the heat engine 104 could be a heat engine of any type, e.g., a gas turbine, spark ignited, diesel, rotary or reciprocating engine of any fuel type and with any configuration of turbomachinery elements, either turbocharger, turbosupercharger, supercharger and exhaust recovery turbo compounding, either mechanically, electrically, hydraulically or pneumatically driven.

With continued reference to FIG. 1, the electrical system 101 includes an electric storage 103 that includes a battery bank, or the like, made up of a plurality of batteries 102. Batteries 102 can be rechargeable batteries. One or more fuel tanks 124 are also provided. Each fuel tank 124 is operatively connected to one or more of heat engines 104 to provide fuel thereto. A fuel control system, e.g. fuel system 133, is disposed between one or more liquid fuel tanks 124 and heat engines 104 to control fuel distribution from one or more fuel tanks 124 to heat engines 104. The hybrid-electric propulsion system 100 may be operatively connected to a 28V aircraft power system 135 to supply 28V power for aircraft systems, e.g. computer systems and the like. Aircraft power system 135 can include one more rectifiers, batteries, and/or distribution systems contained therein. Those skilled in the art will readily appreciate that aircraft power system 135 can provide power to a variety of aircraft electronics systems that run on standard aircraft voltage, e.g. 28V, via output 139.

As shown in FIG. 1, the storage 103 (and the associated batteries 102) are operatively connected to the electric motor 106 for receiving power therefrom or for supplying power thereto by way of an electric motor controller 121. It is contemplated that an electrical distribution system or battery management system can be positioned within the storage 103, or between storage 103 and the electric motor controller 121. The electrical distribution system and/or battery management system is configured for managing the electrical power from the power storage 103, e.g., the batteries 102, to the electric motor 106.

As shown in FIG. 1, the electrical system 101 is electrically coupled to the electric motor 106 by way of a high voltage power bus 123. High voltage power bus 123 can be for 500 V or greater, e.g. a range from 890-1000 V, or higher. The high voltage power bus 123 is bi-directional, meaning power can go to electric motor 106 from electric motor controller 121 and from electric motor 106 to electric motor controller 121. The power storage 103, e.g. the group of batteries 102, is operatively connected to the electric motor controller 121 by a respective conductor 125.

With continued reference to FIG. 1, those skilled in the art will also readily appreciate that hybrid-electric propulsion system 100 can include a motor drive positioned in between the electric motor controller 121 and the electric motor 106. The motor drive is configured for controlling, for instance, a rotational speed of the electric motor 106. It is also contemplated that each set of batteries 102 is connected to one or more inverter/rectifier components (for example, positioned between each storage 103 and its respective electric motor 106) for supplying power from the storage 103 to drive the electric motor 106, or, in an energy recovery mode, to store into storage 103 energy generated by driving the electric motor 106 in a generator mode.

Figure 2:
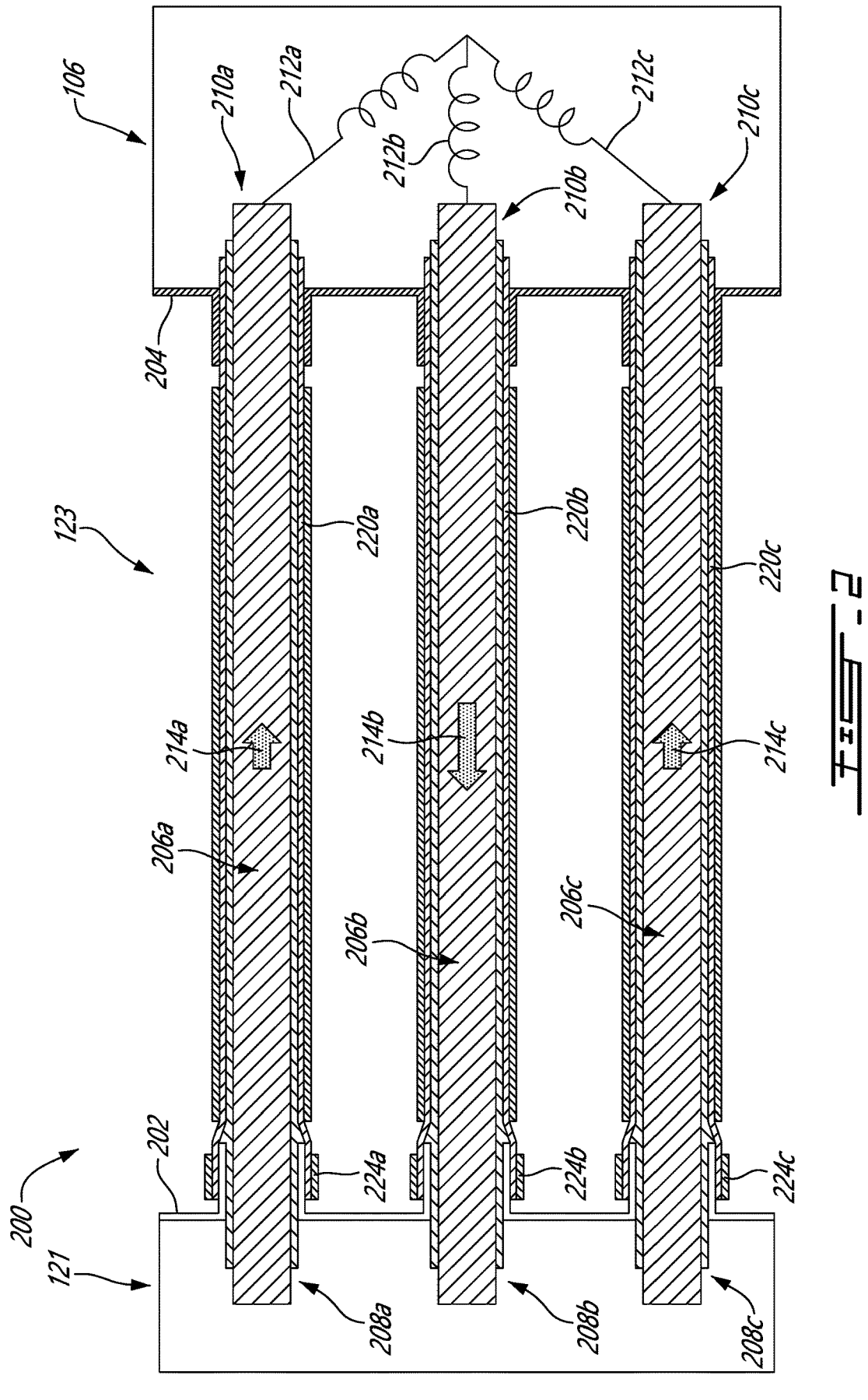
FIG. 2 is a schematic depiction of an exemplary connection between an electric motor controller and an electric motor.

Referring to FIG. 2, there is shown a system 200 for transmitting an alternating current between a source component (also herein referred to as a source of electricity) and a load component (also herein referred to an electric load). In the shown embodiment, the source component is a motor controller 121 and the load component is an electric motor 106 electrically coupled to the motor controller 121 via a power bus 123, for instance of the propulsion system 100 of FIG. 1. It is understood, however, that the system 200 may include other source and load components. For instance, the electrical system 101 may include a transformer (not shown) electrically disposed between the electric motor 106 and a rectifier (not shown), so that, when the electric motor 106 operates in the generator mode, the electric motor 106 may be a source transmitting an alternating current to the transformer (the load), and/or the transformer may be a source transmitting an alternating current to the rectifier (the load), in accordance with the present disclosure. In the shown embodiment, a motor controller connector housing 202 houses the motor controller 121, while an electric motor connector housing 204 houses the electric motor 106. The power bus 123 includes one or more cables 206 electrically coupling the motor controller 121 to the electric motor 106.

In the shown case, the system 200 is a three-phase alternating current (AC) power transmitting system, also referred to as a three-phase cable assembly, that provide AC input power between the motor controller 121 and the electric motor 106, and illustratively includes three cables arranged in parallel: first phase cable 206a, second phase cable 206b, and third phase cable 206c. Other numbers of cables may be contemplated, for instance a single cable 206 in a single-phase AC output system. Each cable 206a, 206b, 206c is electrically coupled to the motor controller 121, and mounted (for instance fastened to) the motor controller connector housing 202 at respective first ends 208a, 208b, 208c, Each cable is also electrically coupled to the electric motor 106, and mounted to the electric motor connector housing 204, at respective second ends 210a, 210b, 210c, illustratively terminating at motor wires 212a, 212b, 212c in the electric motor 106. Each of these connections may be referred to as harnesses. Phase currents 214a, 214b, 214c, for instance at a 120 degree phase shift, are directed between the motor controller 121 and the electric motor 106 via respective cables 206a, 206b, 206c.

Figure 3:
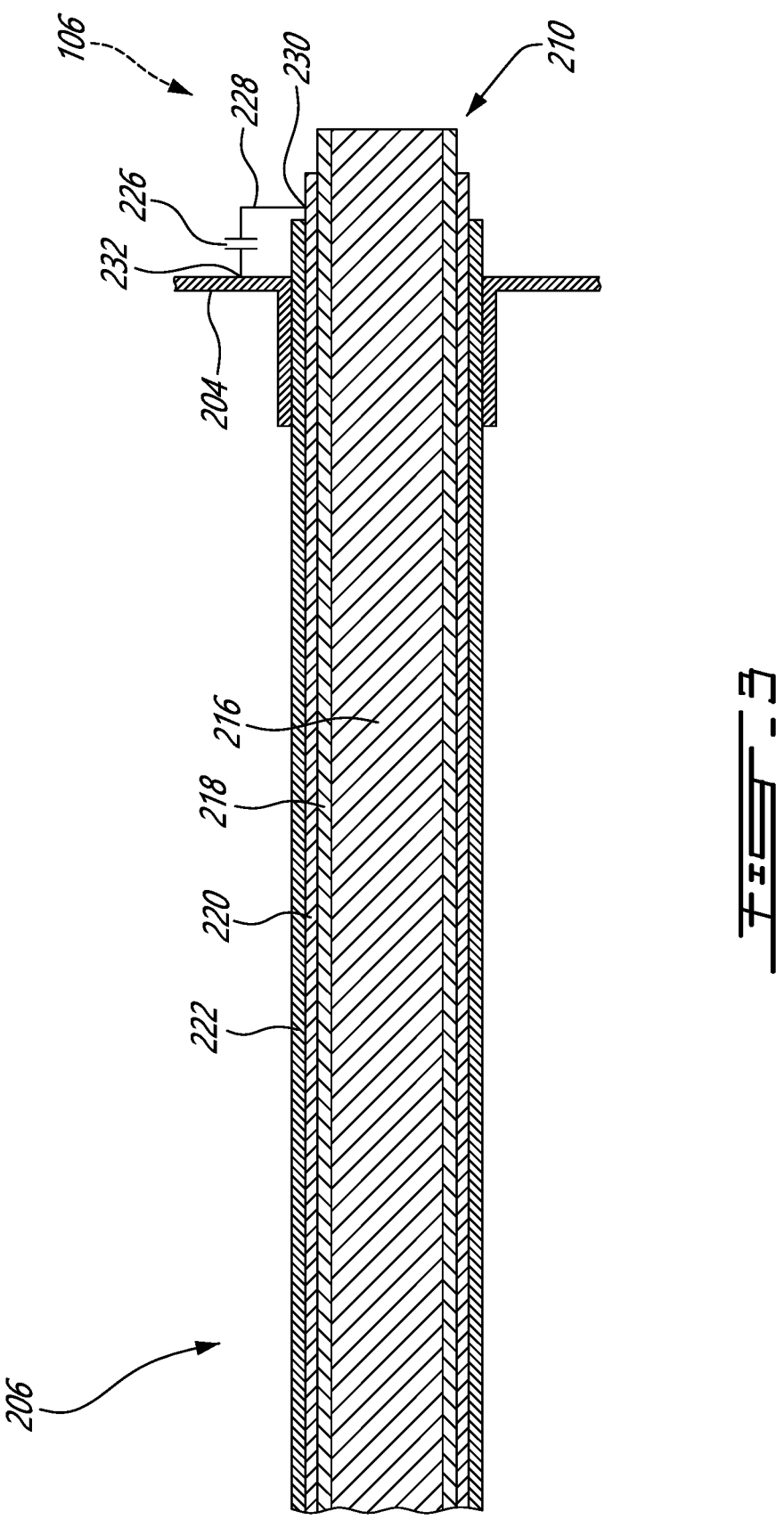
FIG. 3 is a schematic depiction of a cable shield system between the electric motor controller and electric motor of FIG. 2.

Referring to FIG. 3, an exemplary cable 206 (for instance, one of cables 206a, 206b, 206c) is shown terminating at an electric motor connector housing 204 of an electric motor 106 at a second end 210 thereof. The depicted cable 206 includes a conductor 216 (also referred to as a conductor core) through which current travels, a first insulating layer 218 (also referred to as an inner insulating layer) concentrically surrounding the conductor 216, a shield 220, also referred to as a shield layer, concentrically surrounding the first insulating layer 218, and a second insulating layer 222 (also referred to as an outer insulating layer) concentrically surrounding the shield 220. The number and arrangement of insulating layers may vary. The shield 220 extends along an entire length of the cable 206 between first and second ends 208, 210 of the shield (for instance, shield first ends 208a, 208b, 208c and shield second ends 210a, 210b, 210c shown in FIG. 2) and may be operable to contain and redirect various electromagnetic fields, thereby assisting in mitigating electromagnetic interference (EMI). In the context of an electric motor, the shield may prevent EMI of the motor's operation or its effect nearby electronic devices. As such, the shield 220 may be grounded at a shield end, see for instance first shield ends 208a, 208b, 208c and second shield ends 210a, 210b, 210c in FIG. 2), (i.e., to the motor controller connector housing 202 at the first end 208 and to the electric motor connector housing 204 at the second end 210).

By grounding the shield 220 at each end 208, 210 of the cable 206, a conductive path may form through the shield 220, which may lead to localized heating. As such, according to the present disclosure, the shield 220 may be directly connected to one of the connector housings, illustratively to the motor controller connector housing 202, via a shield termination ring (see for instance shield termination rings 224a, 224b and 224c in FIG. 2). By "directly", it is understood that the shield termination ring is the only electric path between the shield 220 and the motor controller connector housing 202, with no other electronic circuitry disposed therebetween. The shield 220 may be connected to the other of the connector housings, illustratively to the electric motor connector housing 204, via a capacitor 226 at least partially housed within the connector housing. The capacitor 226 is the only electric path between the shield 220 and the electric motor connector housing 204 (i.e. the shield is otherwise electrically isolated from the electric motor connector housing 204). The capacitor 226 may be operable to allow the shield 220 to minimize EMI while hindering current flow through the shield 220, as will be discussed in further detail below. At high frequencies, the capacitor 226 may act as a low-impedance, whereas at low frequencies, the capacitor 226 acts as a high-impedance. In normal operation, the frequency of the current passing through the shield 220 is the same as the primary frequency (i.e., at a low frequency) being output by the motor controller 121, which is thus reduced by the capacitor 226. At high frequencies (e.g., at EMI), the capacitor 226 may provide a low impedance path for these signals to travel to the ground (i.e., via electric motor connector housing 204). It is understood that in other embodiments, the shield 220 may be directly connected to the electric motor connector housing 204 and connected to the motor controller connector housing 202 via the capacitor 226. In other embodiments, the shield 220 may be electrically connected to each of the motor controller connector housing 202 and electric motor connector housing 204 via capacitors 226. In other embodiments, a plurality of capacitors 226 arranged in parallel may electrically connect the shield 220 to one or more of the motor controller connector housing 202 and the electric motor connector housing 204.

Referring again to FIG. 3, in an embodiment of a shield and connector housing connection for a cable 206 (for instance, one of cables 206a, 206b, 206c), a wire 228 having a capacitor 226 disposed thereon electrically connects the shield 220 disposed about the cable 206 to the electric motor connector housing 204, the wire 228 and capacitor 226 being disposed inside the electric motor connector housing 204. In particular, a first end 230 of the wire 228 is connected to the shield 220 at a location within the electric motor connector housing 204 (also referred to as a back shell), and a second end 232 of the wire 228 is connected to the electric motor connector housing 204, thereby grounding the shield 220 to the electric motor connector housing 204.

Figure 4:
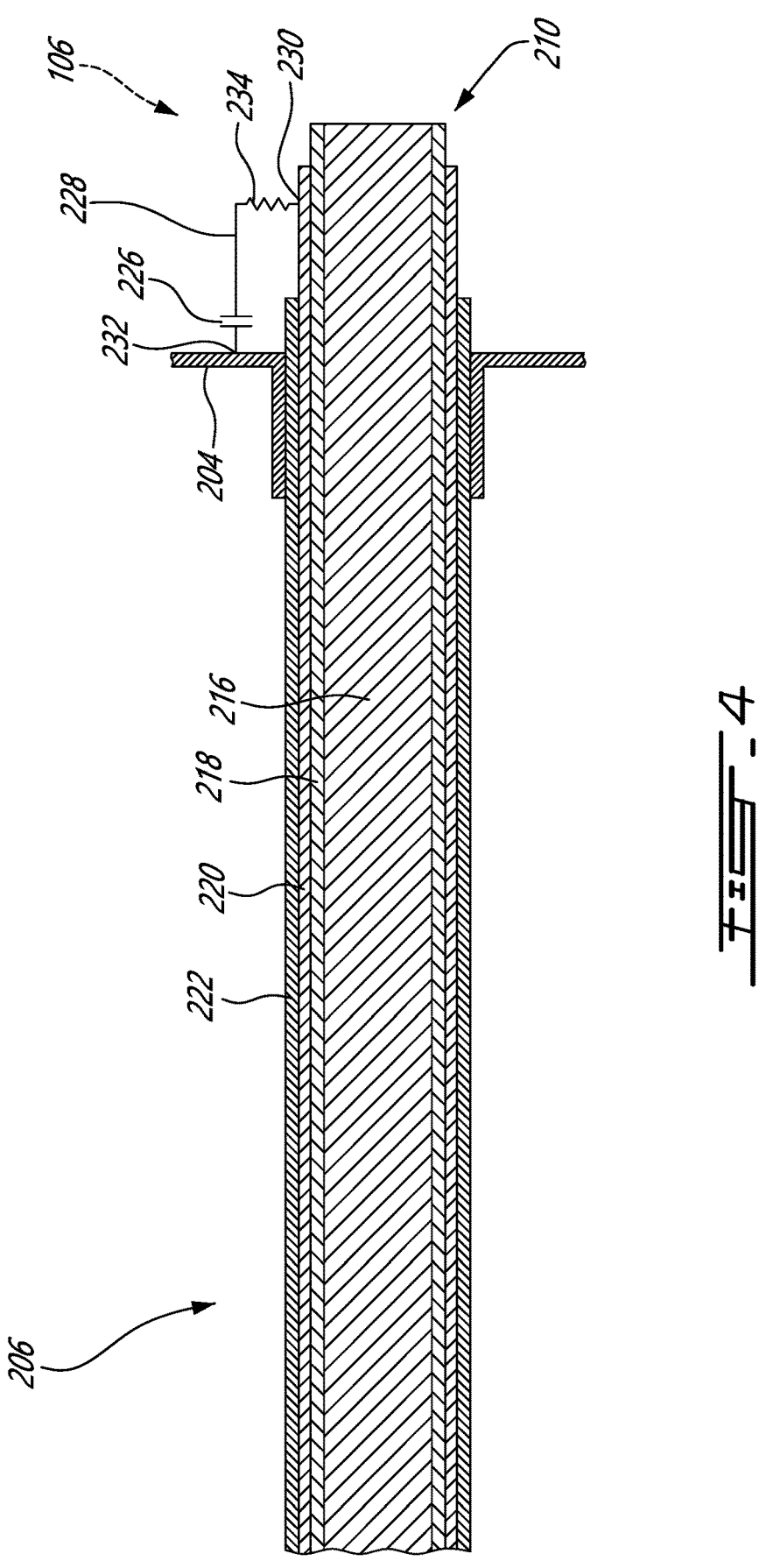
FIG. 4 is a schematic depiction of another cable shield system between the electric motor controller and electric motor of FIG. 2.

Referring now to FIG. 4, another embodiment of a shield and connector housing connection for a cable 206 (for instance, one of cables 206a, 206b, 206c) is shown. As was the case in the embodiment of FIG. 3, a wire 228 and the capacitor 226 disposed inside the electric motor connector housing 204 is connected to the shield 220 at a first end 230 and to the electric motor connector housing 204 at a second end 232. In this embodiment, a capacitor 226 and a resistor 234 are disposed along the wire 228, in series. As discussed in further detail below, the use of a resistor 234 may provide additional tuning capabilities to the system 200. In addition, the use of a resistor 234 may allow the size of the capacitor 226 to be reduced, and may result in less heat generation at the capacitor 226 by limiting the current being directed towards the capacitor 226. In some embodiments, a plurality of sets of capacitors 226 and resistors 234 arranged in parallel (with each set of a capacitor 226 and a resistor 234 disposed in series) may electrically connect the shield 220 to one or more of the motor controller connector housing 202 and the electric motor connector housing 204. Various combinations of capacitors 226 and/or resistors 234 may be contemplated.

In the shown embodiment, the resistor 234 is disposed closer to the first end 230, while the capacitor 226 is disposed closer to the second end 232. The reverse arrangement may also be contemplated. The inclusion of the resistor 234 may, for instance, provide additional tuning capabilities to shield 220, as will be discussed in further detail below.

Referring now to FIG. 5, another embodiment of a shield and connector housing connection for a cable 206 (for instance, one of cables 206a, 206b, 206c) is shown. In this embodiment, a cylindrical capacitor 226' having an annular shape is provided for connecting the shield 220 to the electric motor connector housing 204. In particular, a cylindrical capacitor 226' disposed inside the electric motor connector housing 204 at the second end 210 is concentrically disposed between the shield 220 and an annular portion 236 of the electric motor connector housing 204. The cylindrical capacitor 226' is illustratively received through a cable opening of the electric motor connector housing 204, with an outer diameter surface of the cylindrical capacitor 226' engaging an inner diameter surface of the annular portion 236 circumscribing the cable opening. In this embodiment, there is no wire electrically connecting the shield 220 to the electric motor connector housing 204, as the cylindrical capacitor 226' is in direct contact with both the shield 220 and the electric motor connector housing 204. Other embodiments with a capacitor being in direct contact with the electric motor connector housing 204, i.e., with the wire omitted, may be contemplated. Illustratively, the second insulating layer 222 does not extend along an entire length of the cable 206, instead leaving an annular gap 238 along the length of the cable 206 between the second insulating layer 222 and the cylindrical capacitor 226'. A width of the gap 238 along the length of the cable 206 may vary. In other cases, the gap 238 may be omitted, with the second insulating layer 222 extending towards the electric motor connector housing 204 (i.e., surrounding the capacitor 226'.

Referring now to FIG. 6, another embodiment of a shield and connector housing connection for a cable 206 (for instance, one of cables 206a, 206b, 206c) is shown. As was the case in the embodiment of FIG. 5, a cylindrical capacitor 226' is provided in the electric motor connector housing 204 for connecting the shield 220 to the electric motor connector housing 204, along with a cylindrical resistor 234', each having an annular shape. In particular, both a cylindrical capacitor 226' and a cylindrical resistor 234' at the second end 210 are concentrically disposed between the shield 220 and an annular portion 236 of the electric motor connector housing 204, and thereby connected in series. Illustratively, the cylindrical capacitor 226' is disposed radially inwardly of the cylindrical resistor 234' so that that cylindrical capacitor 226' is circumferentially disposed against the shield 220 and the cylindrical resistor 234' is circumferentially disposed against the annular portion 236 of the electric motor connector housing 204. The opposite arrangement may also be contemplated. As was the case in the embodiment of FIG. 5, this embodiment, there is no wire electrically connecting the shield 220 to the electric motor connector housing 204, as the cylindrical capacitor 226' and cylindrical resistor 234' are in direct contact with the shield 220 or the electric motor connector housing 204. Illustratively, the second insulating layer 222 does not extend along an entire length of the cable 206, instead leaving an annular gap 238 along the length of the cable 206 between the second insulating layer 222 and the cylindrical capacitor 226'. A width of the gap 238 along the length of the cable 206 may vary.

As discussed above, the use of a capacitor 226, 226' allow the shield 220 to minimize EMI while minimizing currents from flowing through the shield 220. In particular, the capacitor 226, 226' may reduce the impedance of shield 220 for EMI signals with high frequencies (for instance, those as above 10 KHz). This may allow the shield 220 to effectively minimize interference with sensitive equipment and ensure compliance with various safety standards. In addition, the capacitor 226, 226' may present higher impedance for lower frequencies (e.g., those of electric motor 106 which may be at 1 KHz, for instance), thereby minimizing induced currents from flowing through the shield and reducing the likelihood of generating heat. In addition, in embodiments where a resistor 234, 234' is provided in series with the capacitor 226, 226', the resistor-capacitor assembly may allow for more increased tuning capabilities based on the specific frequencies of the system. In addition, the termination of the shield 220 about an entire circumference of the cable 206 may ensure effective EMI coverage without leakage. In addition, the positioning of the capacitor 226, 226' inside a connector housing may eliminate lead length, i.e., a length of the wire 228 connecting the shield 220 to the electric motor connector housing 204, to further reduce or eliminate impedance. In particular, in the embodiments shown in FIGS. 5 and 6, the lead length is effectively reduced to zero due to the abutting arrangement of the capacitor 226' (and resistor 234' in FIG. 6)

It is understood that in a three-phase AC power transmitting system such as system 200 of FIG. 2, one or more of the cables 206a, 206b, 206c may include a capacitor 226, 226' and optional resistor 234, 234' to electrically couple a respective shield 220a, 220b, 220c to one or both of the motor controller connector housing 202 and the electric motor connector housing 204. In addition, the end 208, 210 at which the capacitor(s) 226, 226' (and optionally the resistor(s) 234, 234') are disposed may vary.

It is noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A system for transmitting an alternating current in an aircraft, comprising:

a source of electricity in the aircraft having a source connector housing;

an electric load in the aircraft having a load connector housing;

a cable electrically coupling the source of electricity to the electric load;

a shield surrounding the cable and having a first end electrically connected to the source connector housing; and a capacitor disposed inside the load connector housing and electrically coupling a second end of the shield to the load connector housing.

2. The system as defined in claim 1, further comprising a resistor electrically disposed in series with the capacitor to electrically couple the shield to the load connector housing.

3. The system as defined in claim 1, further comprising a wire disposed inside the load connector housing, the capacitor disposed along the wire, the wire electrically coupling the second end of the shield to the load connector housing.

4. The system as defined in claim 2, further comprising a wire disposed inside the load connector housing, the capacitor and the resistor disposed along the wire, the wire electrically coupling the second end of the shield to the load connector housing.

5. The system as defined in claim 1, wherein the capacitor is a cylindrical capacitor concentrically disposed between the shield and an inner diameter surface of the load connector housing.

6. The system as defined in claim 2, wherein the capacitor is a cylindrical capacitor and the resistor is a cylindrical resistor, the cylindrical capacitor and the cylindrical resistor concentrically disposed between the shield and an inner diameter surface of the load connector housing.

7. The system as defined in claim 1, wherein the shield is directly connected to the source connector housing at the first end.

8. An electric motor system for an aircraft, comprising:

a motor controller having a motor controller connector housing;

an electric motor having an electric motor connector housing;

a cable electrically coupling the motor controller to the electric motor; and a shield extending from a first end to a second end, the shield surrounding the cable and grounded to the motor connector housing at the first end and to the electric motor connector housing at the second end, the shield electrically coupled to one of the motor controller connector housing and the electric motor connector housing via a capacitor disposed inside the one of the motor controller connector housing and the electric motor connector housing.

9. The electric motor system as defined in claim 8, wherein the motor controller is operable to output a three-phase output signal to the electric motor, and wherein the cable is a first phase cable, the system further comprising a second phase cable and a third phase cable each disposed in parallel with the first phase cable and electrically coupling the motor controller to the electric motor.

10. The electric motor system as defined in claim 9, further comprising:

a second phase shield surrounding the second phase cable and grounded to the motor connector housing at a second phase first end and to the electric motor connector housing at a second phase second end, the second phase shield electrically coupled to one of the motor controller connector housing and the electric motor connector housing via a second capacitor; and a third phase shield surrounding the third phase cable and grounded to the motor connector housing at a third phase first end and to the electric motor connector housing at a third phase second end, the third phase shield electrically coupled to one of the motor controller connector housing and the electric motor connector housing via a third capacitor.

11. The electric motor system as defined in claim 8, wherein the shield is directly connected to the motor controller connector housing at the first end and to the electric motor connector housing via the capacitor at the second end.

12. The electric motor system as defined in claim 8, further comprising a resistor disposed in series with the capacitor to electrically couple the shield to one of the motor controller connector housing and the electric motor connector housing.

13. The electric motor system as defined in claim 8, further comprising a wire disposed inside the one of the motor controller connector housing and the electric motor connector housing, the capacitor disposed along the wire, the wire electrically coupling the second end of the shield to the one of the motor controller connector housing and the electric motor connector housing.

14. The electric motor system as defined in claim 12, further comprising a wire disposed inside the one of the motor controller connector housing and the electric motor connector housing, the capacitor and the resistor disposed along the wire, the wire electrically coupling the second end of the shield to the one of the motor controller connector housing and the electric motor connector housing.

15. The electric motor system as defined in claim 8, wherein the capacitor is a cylindrical capacitor radially disposed between the shield and an inner diameter surface of the one of the motor controller connector housing and the electric motor connector housing.

16. The electric motor system as defined in claim 12, wherein the capacitor is a cylindrical capacitor and the resistor is a cylindrical resistor, the cylindrical capacitor and the cylindrical resistor radially disposed between the shield and an inner diameter surface of the one of the motor controller connector housing and the electric motor connector housing.

17. An hybrid-electric propulsion system for an aircraft, comprising:

an air mover;

a heat engine rotatably coupled to the air mover;

an electric motor rotatably coupled to the air mover;

a motor controller; and a three-phase cable assembly electrically coupling the motor controller to the electric motor, the three-phase cable assembly comprising three cables arranged in parallel, each of the three cables having a shield surrounding each of the three cable and grounded to a connector for the electric motor via a capacitor disposed in the connector for the electric motor.

18. The hybrid-electric propulsion system as defined in claim 17, further comprising three resistors, each resistor electrically disposed in series with the capacitor of each of the three cables to electrically couple the shield of each of the three cables to the connector for the electric motor.

19. The hybrid-electric propulsion system as defined in claim 17, further comprising a wire disposed inside the connector for the electric motor, the capacitor disposed along the wire, the wire electrically coupling an end of the shield to the connector for the electric motor.

20. The hybrid-electric propulsion system as defined in claim 17, wherein the capacitor of each of the three cables is a cylindrical capacitor concentrically disposed between the shield of each of the three cables and an inner diameter surface of the connector for the electric motor.

\* \* \* \* \*